US011008817B2

(12) United States Patent
Stokes et al.

(10) Patent No.: US 11,008,817 B2
(45) Date of Patent: May 18, 2021

(54) ALIGNING TWO PARTS OF A TUBULAR ASSEMBLY

(71) Applicant: Halliburton Energy Services, Inc., Houston, TX (US)

(72) Inventors: Matthew Bradley Stokes, Keller, TX (US); Wesley Paul Dietz, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/489,429

(22) PCT Filed: Oct. 4, 2018

(86) PCT No.: PCT/US2018/054424
§ 371 (c)(1),
(2) Date: Aug. 28, 2019

(87) PCT Pub. No.: WO2020/072063
PCT Pub. Date: Apr. 9, 2020

(65) Prior Publication Data
US 2020/0378193 A1 Dec. 3, 2020

(51) Int. Cl.
*E21B 17/042* (2006.01)
*F16L 15/08* (2006.01)
(52) U.S. Cl.
CPC .......... *E21B 17/042* (2013.01); *F16L 15/08* (2013.01)
(58) Field of Classification Search
CPC ......... F16L 15/08; F16L 15/00; E21B 17/042; E21B 17/0423; E21B 17/0426; E21B 17/043
(Continued)

(56) References Cited

U.S. PATENT DOCUMENTS 1,349,518 A * 8/1920 Lyle ...................... E21B 17/043
285/89
3,726,151 A 4/1973 Lemor
(Continued)

FOREIGN PATENT DOCUMENTS

WO 2014094161 6/2014

OTHER PUBLICATIONS

ISRWO International Search Report and Written Opinion for PCT/US2018/054424 dated Jul. 4, 2019.

*Primary Examiner* — Aaron M Dunwoody
(74) *Attorney, Agent, or Firm* — Scott Richardson; C. Tumey Law Group PLLC

(57) ABSTRACT

Systems and methods are directed to aligning two subsequent pieces of equipment prior to disposing the pieces of equipment downhole. A method comprises providing the first tool piece to be disposed in a wellbore, wherein the first tool piece comprises: a first thread, wherein the first thread is disposed at a first end of the first tool piece; and a second thread, wherein the second thread is disposed at the first end of the first tool piece. The method further comprises disposing an alignment ring on the first tool piece, and coupling the first end of the first tool piece to a second end of the second tool piece. The method further comprises decoupling the first tool piece from the second tool piece; rotating the alignment ring; and coupling the first tool piece to the second tool piece after rotating the alignment ring to produce the tubular assembly.

20 Claims, 3 Drawing Sheets

(58) Field of Classification Search
USPC ................................. 285/309, 391, 89, 92
See application file for complete search history.

(56) References Cited

U.S. PATENT DOCUMENTS

| | | | | |
|---|---|---|---|---|
| 3,762,745 | A * | 10/1973 | Cunningham | E21B 17/042 |
| | | | | 285/92 |
| 4,067,404 | A * | 1/1978 | Crase | E21B 7/067 |
| | | | | 175/75 |
| 4,303,135 | A * | 12/1981 | Benoit | E21B 7/067 |
| | | | | 175/73 |
| 4,613,162 | A | 9/1986 | Hughes | |
| 5,083,821 | A * | 1/1992 | Friend | F16B 39/01 |
| | | | | 277/626 |
| 5,921,580 | A * | 7/1999 | Dyer | F16L 19/00 |
| | | | | 283/32 |
| 6,588,315 | B2 * | 7/2003 | Jenne | E21B 4/145 |
| | | | | 138/155 |
| 7,108,063 | B2 | 9/2006 | Carstensen | |
| 8,827,316 | B2 * | 9/2014 | Raczynski | E21B 17/042 |
| | | | | 285/89 |
| 2004/0164548 | A1 * | 8/2004 | Richey | F16L 41/007 |
| | | | | 285/89 |
| 2004/0256856 | A1 * | 12/2004 | Spears | F16L 15/08 |
| | | | | 285/390 |
| 2007/0063513 | A1 | 3/2007 | Boyd | |
| 2015/0316180 | A1 * | 11/2015 | Marchand | F16L 15/08 |
| | | | | 285/390 |
| 2017/0328140 | A1 * | 11/2017 | D'Silva | E21B 17/042 |

\* cited by examiner

ALIGNING TWO PARTS OF A TUBULAR ASSEMBLY

BACKGROUND

Hydrocarbons, such as oil and gas, may be obtained from subterranean formations that may be located onshore or offshore. The development of subterranean operations and the processes involved in removing hydrocarbons from a subterranean formation typically may involve a number of different steps such as, for example, drilling a wellbore at a desired well site, treating the wellbore to optimize production of hydrocarbons, and performing the necessary steps to produce and process the hydrocarbons from the subterranean formation.

After drilling a wellbore that intersects a subterranean hydrocarbon-bearing formation, a variety of wellbore tools may be positioned in the wellbore during completion, production, or for remedial activities. It may be beneficial to be able to rotationally and/or azimuthally orient a wellbore tool component on a tool string relative to another wellbore tool component on the tool string. For example, a first tool component on a tool string may be oriented in a certain direction relative to a second tool component on the tool string such that, when the first tool component is lowered into a wellbore and locked into place, the second tool component is locked in a desired orientation.

Traditionally, a casing alignment subassembly may have been used to align the tool components with respect to each other. The casing alignment subassembly may require a great amount of rig time, which may be used for other operations. Additionally, the casing alignment subassembly further may be prone to mistakes that led to misalignment. Using the casing alignment subassembly may increase overall cost of a consumer in areas of manufacturing, inventory, and shipping of the unit. It may be beneficial to replace the process of alignment with a casing alignment subassembly with a simpler method.

BRIEF DESCRIPTION OF THE DRAWINGS

These drawings illustrate certain aspects of some examples of the present disclosure, and should not be used to limit or define the disclosure.

DETAILED DESCRIPTION

This disclosure may generally relate to an alignment procedure. More particularly, systems and methods may be provided for properly aligning two subsequent pieces of equipment prior to disposing the pieces of equipment downhole. Typically, a casing alignment subassembly may be used for such an operation. However, utilizing a casing alignment subassembly may increase rig time and cost. Additionally, a casing alignment subassembly may be prone to mistakes in misalignment.

Figure 1:
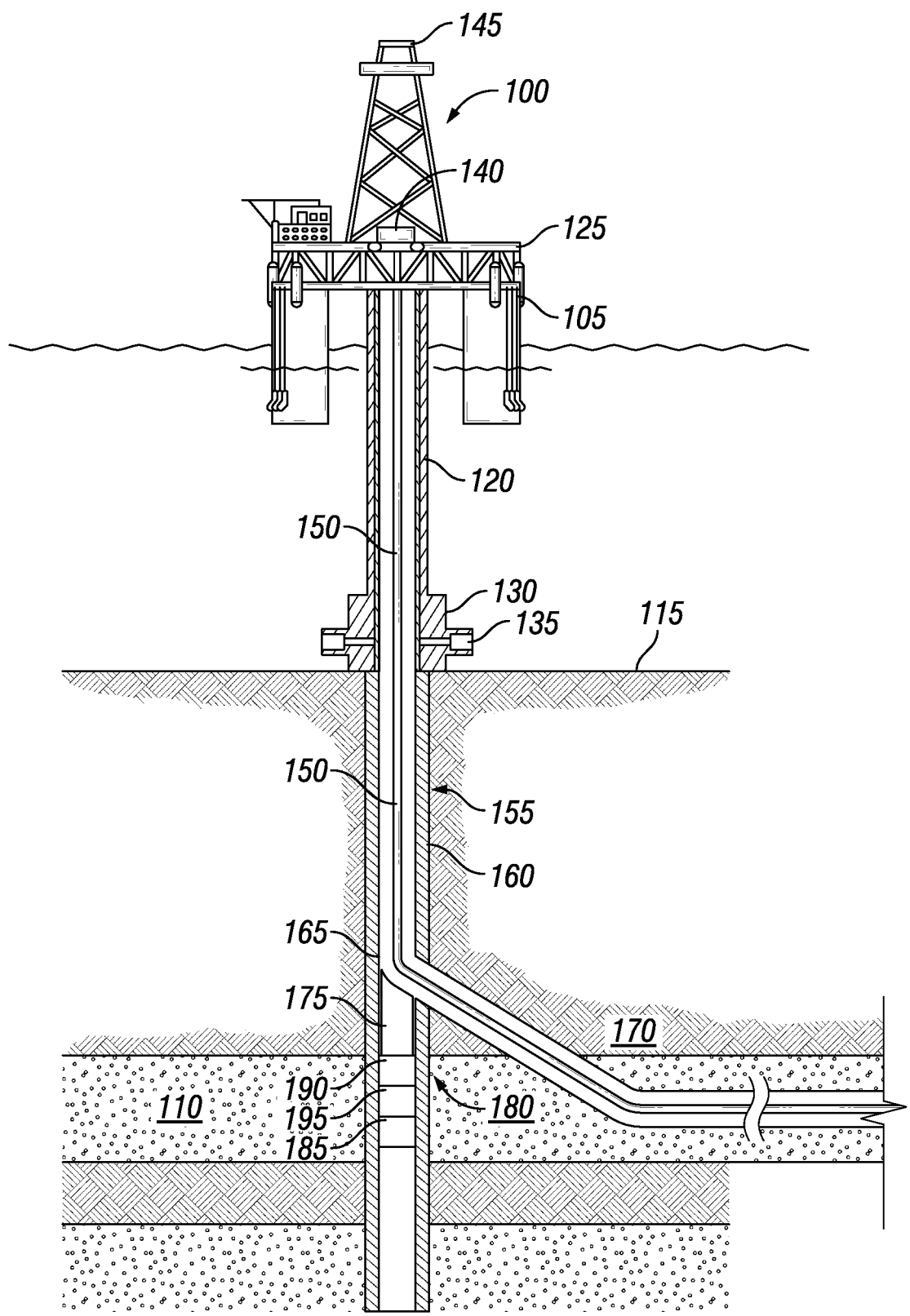
FIG. 1 illustrates a well system.

FIG. 1 illustrates a well system 100 that may employ one or more of the principles of the present disclosure, according to one or more examples. In one example, as illustrated, well system 100 may be or otherwise include an offshore oil and gas platform 105. Platform 105 may be a semi-submersible platform centered over a submerged oil and gas subterranean formation 110 located below a sea floor 115. A subsea conduit 120 may extend from a deck 125 of platform 105 to a wellhead installation 130 that may include one or more blowout preventers 135. Platform 105 may further comprise a hoisting apparatus 140 and a derrick 145 for raising and lowering pipe strings, such as a tubular string 150, within subsea conduit 120. In examples, tubular string 150 may include a tubing string, wireline, slick line, coil tubing, drill pipe, and/or any other suitable conveyance.

As depicted, a main wellbore 155 may be drilled through the various earth strata below sea floor 115, including subterranean formation 110. A casing string 160 may be at least partially cemented within main wellbore 155. The term "casing" or "casing string" is used herein to designate a string of tubular segments or pipes used to line a wellbore. Casing string 160 may actually be of the type known to those skilled in the art as "liner" and may be a segmented liner or a continuous liner.

In some examples, a casing joint 165 may be interconnected between elongate portions or lengths of casing string 160 and positioned at a desired location within main wellbore 155 where a branch or lateral wellbore 170 is to be drilled. In other examples, however, casing joint 165 may be omitted from the well system, and lateral wellbore 170 may be milled at the desired location within main wellbore 155. A whipstock 175 may be positioned within casing string 160 at a desired location and may be configured to deflect one or more cutting tools (i.e., mills) into the inner wall of casing string 160 (i.e., casing joint 165, if used) to mill a casing exit (not illustrated) at a desired circumferential location. The casing exit may provide a "window" in casing string 160 through which one or more other cutting tools (i.e., drill bits) may be inserted in order to drill lateral wellbore 170.

To install whipstock 175 in main wellbore 155 so that lateral wellbore 170 may be drilled at the proper location and orientation, whipstock 175 may be lowered into main wellbore 155 on tubular string 150. An anchor assembly 180 may be used to properly locate and orient the whipstock 175. Anchor assembly 180 may include various tools and tubular lengths interconnected in order to rotate and align whipstock 175 (both radially and axially) to the correct exit angle orientation and axial well depth in preparation for forming the casing exit and milling lateral wellbore 170. In typical examples, anchor assembly 180 may include a latch coupling assembly 185, an alignment bushing 190, and a casing alignment subassembly (not shown). Latch coupling assembly 185 may include a latch coupling (not shown) that provides an inner latch profile and a plurality of circumferential alignment elements. The latch coupling may be configured to receive a corresponding latch (not shown) operatively coupled to whipstock 175. Alignment bushing 190 may have a longitudinal slot that is circumferentially referenced to the circumferential alignment elements of latch coupling assembly 185. The casing alignment subassembly may have been positioned between latch coupling assembly 185 and alignment bushing 190 and used to ensure proper alignment of the latch coupling in latch coupling assembly 185 relative to alignment bushing 190.

Concerning the present disclosure, an alignment ring 195 may be used rather than a casing alignment subassembly to properly align latch coupling assembly 185 with alignment bushing 190. Alignment ring 195 may simplify the process of coupling latch coupling assembly 185 to alignment bushing 190 by eliminating the need for a casing alignment subassembly. Without employing a casing alignment subassembly, an operator may reduce the complexity of the coupling process, rig time, mistakes caused by misalignment, cost, and/or combinations thereof. In examples, an operator may be defined as an individual, group of individuals, or an organization.

It will be appreciated that, while well system 100 is described herein with reference to locating and setting whipstock 175 within the main wellbore 155, several other known downhole tools may equally be set within the whipstock 175 using the present disclosed method and its various examples described herein below. For example, other downhole tools that may benefit include, but are not limited to, a mill guide, a completion deflector, a logging device, a perforating gun, an isolation sleeve, and any combination thereof. Even though FIG. 1 depicts a vertical section of the main wellbore 155, the examples described in the present disclosure are equally applicable for use in wellbores having other directional configurations including horizontal wellbores, deviated wellbores, slanted wellbores, combinations thereof, and the like. Use of directional terms such as above, below, upper, lower, upward, downward, uphole, downhole, and the like are used in relation to the illustrative examples as they are depicted in the figures, the upward direction being toward the top of the corresponding figure and the downward direction being toward the bottom of the corresponding figure, the uphole direction being toward the surface of the well and the downhole direction being toward the toe of the well. Additionally, it will be appreciated by those skilled in the art, that the principles of the present disclosure are equally well suited for use in or on other types of oil and gas rigs, such as land-based oil and gas rigs or wellhead installations.

Figure 2:
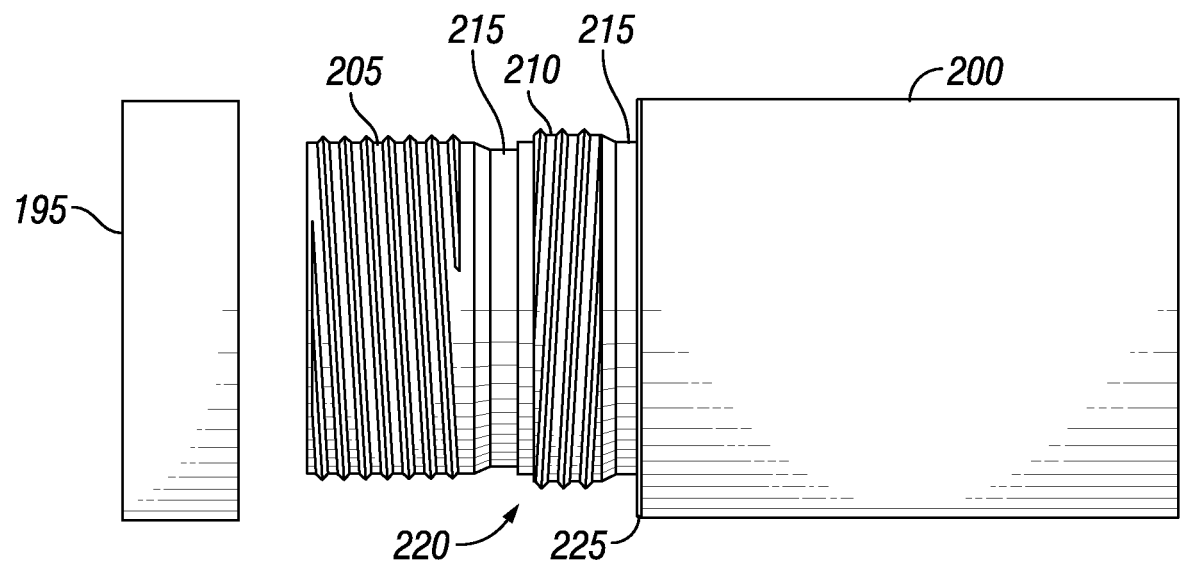
FIG. 2 illustrates an exploded view of an alignment ring and a first tool piece.

FIG. 2 illustrates an exploded view of alignment ring 195 and a first tool piece 200. Without limitations, first tool piece 200 may be any suitable piece of equipment and/or downhole tool requiring attachment to a subsequent piece of equipment and/or downhole tool, as previously described. First tool piece 200 may comprise a first thread 205, a second thread 210, and at least one thread relief 215. As illustrated, first thread 205, second thread 210, and the at least one thread relief 215 may be disposed at a first end 220 of first tool piece 200. In examples, first tool piece 200 may be manufactured initially comprising first thread 205, second thread 210, thread relief 215, and/or any combinations thereof. Additionally, first tool piece 200 may be retrofitted to further comprise first thread 205, second thread 210, thread relief 215, and/or any combinations thereof. First thread 205 and second thread 210 may be used interchangeably. First thread 205 and second thread 210 may both be male threads. First thread 205 and second thread 210 may have an equal thread pitch. Without limitations, first thread 205 and second thread 210 may have a thread pitch of about 2 millimeters to about 16 millimeters. In certain examples, first thread 205 and second thread 210 may have a thread pitch of about 4 to about 8. First thread 205 and second thread 210 may have equal or different lengths. Without limitations, the length of either first thread 205 and/or second thread 210 may be from about one inch (2.5 cm) to about six inches (15 cm). In examples, first thread 205 may be right-handed thread, and second thread 210 may be left-handed thread (or vice versa). In further examples, first thread 205 may have a larger outer diameter than second thread 210. Alternatively, second thread 210 may have a larger outer diameter than first thread 205. In other examples, first thread 205 and second thread 210 may have an equivalent outer diameter.

As illustrated, the at least one thread relief 215 may be disposed in between first thread 205 and second thread 210. Thread relief 215 may provide a clearance for a change in diameter of first tool piece 200. There may be an additional thread relief 215 disposed between second thread 210 and a shoulder 225 of first tool piece 200.

In examples, alignment ring 195 may be disposed about first end 220 of first tool piece 200 to abut shoulder 225. The inner surface of alignment ring 195 may be threaded and may slip over first end 220 of first tool piece 200. The threads on the inner surface of alignment ring 195 may have similar dimensions as those of second thread 210 so as to be complementary to second thread 210. After alignment ring 195 is disposed over first thread 205, alignment ring 195 may threadably engage second thread 210. Alignment ring 195 may be made from any suitable material. Suitable materials may include, but are not limited to, metals, non-metals, polymers, ceramics, and/or combinations thereof. Alignment ring 195 may be any suitable size, height, and/or shape. Without limitation, a suitable shape may include, but is not limited to, cross-sectional shapes that are circular, elliptical, triangular, rectangular, square, hexagonal, and/or combinations thereof. In examples, alignment ring 195 may have a circular cross-sectional shape with an inner and outer diameter. The inner diameter of alignment ring 195 may be larger or equal to the outer diameter of first thread 205 and/or second thread 210. The outer diameter of alignment ring 195 may be smaller than, equal to, or larger than the height of shoulder 225. Without limitation, the inner diameter may be from about two inches (5 cm) to about twelve inches (30 cm). Without limitation, the outer diameter may be from about 2.5 inches (6.4 cm) to about 14 inches (36 cm). In examples, the ends defining the length of alignment ring 195 may be flat. Without limitations, the length of alignment ring 195 may be from about one inch (2.5 cm) to about six inches (15 cm). In examples, the length of alignment ring 195 may be at least one thread pitch shorter than second thread 210 so as to allow at least one full rotation around second thread 210. In alternative examples, one or both ends of alignment ring 195 may comprise protrusions similar to those of gear teeth. In these examples, the protrusions may help secure alignment ring 195 to first tool piece 200, wherein there are protrusions similar to those of gear teeth that are complementary to those of alignment ring 195 disposed within shoulder 225.

Figure 3:
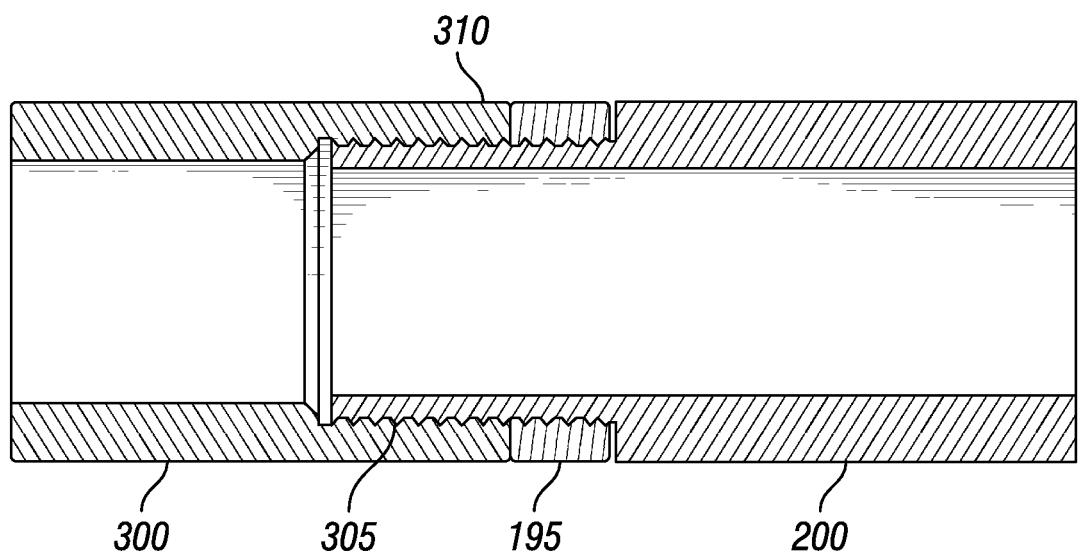
FIG. 3 illustrates an alignment ring being used to couple a first tool piece to a second tool piece.
Figure 4:
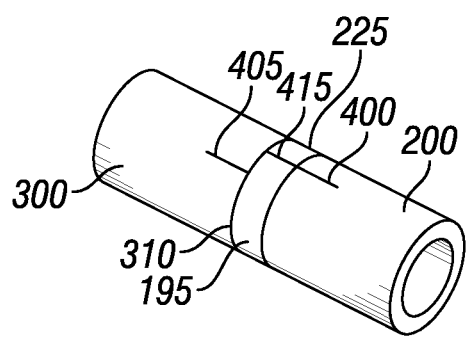
FIG. 4 illustrates an example step in a method for coupling a first tool piece to a second tool piece with an alignment ring.
Figure 5:
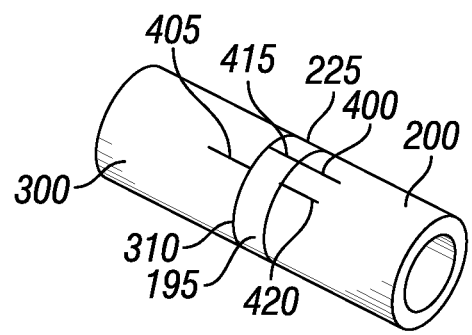
FIG. 5 illustrates an example step in a method for coupling a first tool piece to a second tool piece with an alignment ring.

FIG. 3 illustrates a view of alignment ring 195 being used to couple first tool piece 200 to a second tool piece 300. Without limitations, second tool piece 300 may be any suitable piece of equipment and/or downhole tool requiring attachment to a subsequent piece of equipment and/or downhole tool, as previously described. Second tool piece 300 may comprise a female thread 305 at a second end 310 of second tool piece 300. As illustrated, female thread 305 may be used to secure second tool piece 300 onto first tool piece 200. In examples, female thread 305 may have similar dimensions as those of first thread 205 (i.e., referring to FIG. 2) so as to be complementary to first thread 205. Second tool piece 300 may be attached to first tool piece 200 by threading first thread 205 into female thread 305.

FIGS. 4-7 illustrate various steps in a method of coupling first tool piece 200 to second tool piece 300 with alignment ring 195. In examples, a first mark 400 may be disposed on first tool piece 200, and a second mark 405 may be disposed on second tool piece 300. First mark 400 and second mark 405 may be temporarily or permanently disposed on first tool piece 200 and second tool piece 300 respectively by any suitable means. First mark 400 and second mark 405 may be any suitable size, height, and/or shape. In examples, first mark 400 and second mark 405 may be lines traversing a certain length parallel to the central axis of first tool piece 200 and second tool piece 300. First mark 400 may be used to reference an arbitrary feature or part of first tool piece 200 in relation to second mark 405. A reference may be needed for aligning consecutive parts to operate and function together in order to complete a plurality of downhole operations. As previously described in FIG. 1, without limitations, the location of a casing exit window may be dependent on the alignment between a milling assembly and a whipstock (i.e., whipstock 175). First mark 400 may be disposed at first end 220 of first tool piece 200. Additionally, second mark 405 may be used to reference an arbitrary feature or part of second tool piece 300 in relation to first mark 400. Second mark 405 may be disposed at second end 310 of second tool piece 300.

Figure 6:
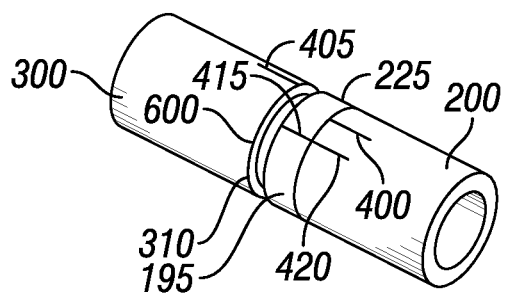
FIG. 6 illustrates an example step in a method for coupling a first tool piece to a second tool piece with an alignment ring.
Figure 7:
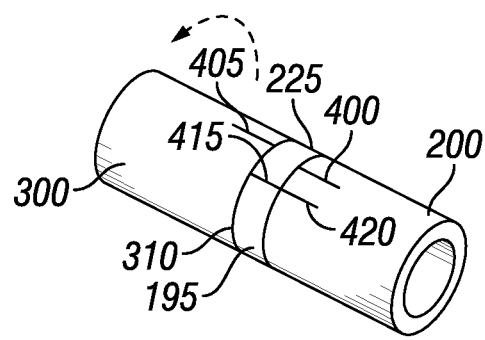
FIG. 7 illustrates an example step in a method for coupling a first tool piece to a second tool piece with an alignment ring

In examples, first tool piece 200 may be aligned with second tool piece 300 by utilizing first mark 400 and second mark 405 with alignment ring 195. As illustrated, alignment ring 195 may be disposed between first tool piece 200 and second tool piece 300. Initially, first tool piece 200 may be coupled to second tool piece 300 and torqued so as to have alignment ring 195 directly disposed against both first tool piece 200 and second tool piece 300. An operator may transcribe an alignment mark 415 onto alignment ring 195 that may be a continuation of first mark 400 from first tool piece 200 (as best seen on FIG. 4). In examples, alignment mark 415 may be temporarily or permanently disposed onto alignment ring 195. Without limitations, alignment mark 415 may be any suitable pre-defined length. Then, the operator may transcribe an offset mark 420 onto first tool piece 200 that may be a continuation of second mark 405 from second tool piece 300 (as best seen on FIG. 5). In examples, offset mark 420 may be temporarily or permanently disposed onto first tool piece 200. Without limitations, offset mark 420 may be any suitable pre-defined length. The operator may then decouple first tool piece 200 from second tool piece 300 (as best seen on FIG. 6) using tongs (not illustrated). Without limitations, any suitable tongs may be used to decouple first tool piece 200 from second tool piece 300 including, but not limited to, breakout tongs, chain tongs, makeup tongs, and/or the like. Decoupling first tool piece 200 from second tool piece 300 may change the relative position between first mark 400 and second mark 405. As first tool piece 200 decouples from second tool piece 300, a tolerance gap 600 may form between alignment ring 195 and first tool piece 200 or second tool piece 300. In examples, the width of tolerance gap 600 may be equal to at least one thread pitch. As illustrated in FIG. 6, tolerance gap 600 may be an empty space provided wherein alignment ring 195 may be able to move.

The operator may rotate alignment ring 195 so as to align alignment mark 415 with offset mark 420. In examples, the relative distance between the initial position of alignment mark 415 and the final position of alignment mark 415 being aligned with offset mark 420 may be the same relative distance between first mark 400 and second mark 405 after decoupling first tool piece 200 from second tool piece 300. The operator may then couple and torque first tool piece 200 to second tool piece 300 (as best seen on FIG. 7) by using any suitable tongs. Coupling first tool piece 200 to second tool piece 300 may align first mark 400 with second mark 405, thus aligning first tool piece 200 to second tool piece 300 in a desired state. A proper, aligned state may prevent failure of equipment as equipment may be damaged when operating in a misaligned state. The disclosed method may reduce the cost of replacing such damaged equipment in addition to reducing rig time, as rig time would increase in order to remove and replace the damaged equipment. Additionally, the present method may remove the use of a traditionally used piece of equipment (i.e., a casing alignment sub), thereby further reducing cost.

The present systems and methods may include any of the various features of the systems and methods disclosed herein, including one or more of the following statements.

Statement 1. A method of aligning a first tool piece with a second tool piece to produce a tubular assembly, comprising: providing the first tool piece to be disposed in a wellbore, wherein the first tool piece comprises: a first thread, wherein the first thread is disposed at a first end of the first tool piece; and a second thread, wherein the second thread is disposed at the first end of the first tool piece adjacent to the first thread, and wherein the first thread and the second thread have opposing handedness; disposing an alignment ring on the first tool piece, wherein the alignment ring engages with the second thread; coupling the first end of the first tool piece to a second end of the second tool piece, wherein the second tool piece engages with the first thread, wherein the alignment ring is disposed between the first tool piece and the second tool piece; decoupling the first tool piece from the second tool piece; rotating the alignment ring; and coupling the first tool piece to the second tool piece after rotating the alignment ring to produce the tubular assembly.

Statement 2. The method of statement 1, further comprising: transcribing a first mark onto the first tool piece; transcribing a second mark onto the second tool piece; and utilizing tongs to couple and decouple the first tool piece from the second tool piece.

Statement 3. The method of statement 2, wherein the tongs are be selected from the group consisting of breakout tongs, chain tongs, and makeup tongs.

Statement 4. The method of statement 2, wherein the first mark is a line traversing a length parallel to a central axis of the first tool piece disposed at the first end of the first tool piece, wherein the first mark serves as a reference to a feature on the first tool piece.

Statement 5. The method of statement 2, wherein the second mark is a line traversing a length parallel to a central axis of the second tool piece disposed at the second end of the second tool piece, wherein the second mark serves as a reference to a feature on the second tool piece.

Statement 6. The method of statement 2, further comprising transcribing an alignment mark onto the alignment ring, wherein the alignment mark is a continuation of the first mark from the first tool piece.

Statement 7. The method of statement 6, further comprising of transcribing an offset mark onto the first tool piece, wherein the offset mark is a continuation of the second mark from the second tool piece.

Statement 8. The method of statement 7, wherein rotating the alignment ring comprises of aligning the alignment mark with the offset mark.

Statement 9. The method of any of the preceding statements, wherein decoupling the first tool piece from the second tool piece produces a tolerance gap, wherein the tolerance gap allows the alignment ring to rotate.

Statement 10. The method of any of the preceding statements, further comprising disposing the tubular assembly downhole into a wellbore.

Statement 11. The method of any of the preceding statements, wherein the first thread and the second thread have equivalent thread pitch.

Statement 12. A method of aligning a first tool piece with a second tool piece to produce a tubular assembly, comprising: disposing an alignment ring on the first tool piece; coupling the first tool piece to the second tool piece, wherein the alignment ring is disposed between the first tool piece and the second tool piece; transcribing a first mark onto the first tool piece, wherein the first mark is a line traversing a length parallel to a central axis of the first tool piece disposed at a first end of the first tool piece; transcribing a second mark onto the second tool piece, wherein the second mark is a second line traversing a length parallel to a central axis of the second tool piece disposed at a second end of the second tool piece; transcribing an alignment mark onto the alignment ring; transcribing an offset mark onto the first tool piece; decoupling the first tool piece from the second tool piece; rotating the alignment ring, wherein rotating the alignment ring comprises of aligning the alignment mark with the offset mark; coupling the first tool piece to the second tool piece; applying a torque to the first tool piece and the second tool piece to seat the first tool piece and the second tool piece to the alignment ring to produce the tubular assembly; and inserting the tubular assembly downhole into a wellbore.

Statement 13. The method of statement 12, wherein decoupling the first tool piece from the second tool piece produces a tolerance gap, wherein the tolerance gap allows the alignment ring to rotate.

Statement 14. The method of statement 12 or 13, wherein the alignment ring has an inner diameter of from about 2 inches to about 12 inches and an outer diameter of from about 2.5 inches to about 14 inches.

Statement 15. A tubular assembly, comprising: a first tool piece, wherein the first tool piece comprises a first thread and a second thread, wherein the first thread and the second thread are disposed at a first end of the first tool piece, wherein the first thread and the second thread have opposing handedness; a second tool piece, wherein the second tool piece comprises a female thread disposed at a second end of the second tool piece, wherein the second end of the second tool piece is coupled to the first end of the first tool piece, wherein the female thread is engaged with the first thread; and an alignment ring in engagement with the second thread of the first tool piece, wherein the alignment ring is disposed between the first tool piece and the second tool piece, and wherein an alignment mark is disposed on an outer surface of the alignment ring.

Statement 16. The tubular assembly of statement 15, wherein an inner surface of the alignment ring is threaded.

Statement 17. The tubular assembly of statement 15 or 16, wherein a first end of the alignment ring comprises at least one protrusion.

Statement 18. The tubular assembly of statement 17, wherein the at least one protrusion is configured to engage the first tool piece or the second tool piece.

Statement 19. The tubular assembly of any one of statements 15 to 18, wherein the alignment ring has an inner diameter of from about 2 inches to about 12 inches and an outer diameter of from about 2.5 inches to about 14 inches.

Statement 20. The tubular assembly of any one of statements 15 to 19, wherein the first thread and the second thread have equivalent thread pitch.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A tubular assembly, comprising:
    a first tool piece, wherein the first tool piece comprises a first thread and a second thread, wherein the first thread and the second thread are disposed at a first end of the first tool piece, wherein the first thread and the second thread have opposing handedness;

a second tool piece, wherein the second tool piece comprises a female thread disposed at a second end of the second tool piece, wherein the second end of the second tool piece is coupled to the first end of the first tool piece, wherein the female thread is engaged with the first thread; and an alignment ring in engagement with the second thread of the first tool piece, wherein the alignment ring is disposed between the first tool piece and the second tool piece, and wherein an alignment mark is disposed on an outer surface of the alignment ring.

2. The tubular assembly of claim 1, wherein an inner surface of the alignment ring is threaded.

3. The tubular assembly of claim 1, wherein the alignment ring comprises a first end.

4. The tubular assembly of claim 3, wherein the first end is configured to engage the first tool piece or the second tool piece.

5. The tubular assembly of claim 1, wherein the alignment ring has an inner diameter of from about 2 inches to about 12 inches and an outer diameter of from about 2.5 inches to about 14 inches.

6. The tubular assembly of claim 1, wherein the first thread and the second thread have equivalent thread pitch.

7. A method of aligning a first tool piece with a second tool piece to produce a tubular assembly, comprising:
   providing the first tool piece to be disposed in a wellbore, wherein the first tool piece comprises:
      a first thread, wherein the first thread is disposed at a first end of the first tool piece; and
      a second thread, wherein the second thread is disposed at the first end of the first tool piece adjacent to the first thread, and wherein the first thread and the second thread have opposing handedness;
   disposing an alignment ring on the first tool piece, wherein the alignment ring engages with the second thread;
   coupling the first end of the first tool piece to a second end of the second tool piece, wherein the second tool piece engages with the first thread, wherein the alignment ring is disposed between the first tool piece and the second tool piece;
   decoupling the first tool piece from the second tool piece;
   rotating the alignment ring; and
   coupling the first tool piece to the second tool piece after rotating the alignment ring to produce the tubular assembly.

8. The method of claim 7, further comprising:
   transcribing a first mark onto the first tool piece;
   transcribing a second mark onto the second tool piece; and
   utilizing tongs to couple and decouple the first tool piece from the second tool piece.

9. The method of claim 8, wherein the tongs are be selected from the group consisting of breakout tongs, chain tongs, and makeup tongs.

10. The method of claim 8, wherein the first mark is a line traversing a length parallel to a central axis of the first tool piece disposed at the first end of the first tool piece, wherein the first mark serves as a reference to a feature on the first tool piece.

11. The method of claim 8, wherein the second mark is a line traversing a length parallel to a central axis of the second tool piece disposed at the second end of the second tool piece, wherein the second mark serves as a reference to a feature on the second tool piece.

12. The method of claim 8, further comprising transcribing an alignment mark onto the alignment ring, wherein the alignment mark is a continuation of the first mark from the first tool piece.

13. The method of claim 12, further comprising of transcribing an offset mark onto the first tool piece, wherein the offset mark is a continuation of the second mark from the second tool piece.

14. The method of claim 13, wherein rotating the alignment ring comprises of aligning the alignment mark with the offset mark.

15. The method of claim 7, wherein decoupling the first tool piece from the second tool piece produces a tolerance gap, wherein the tolerance gap allows the alignment ring to rotate.

16. The method of claim 7, further comprising disposing the tubular assembly downhole into a wellbore.

17. The method of claim 7, wherein the first thread and the second thread have equivalent thread pitch.

18. A method of aligning a first tool piece with a second tool piece to produce a tubular assembly, comprising:
   disposing an alignment ring on the first tool piece;
   coupling the first tool piece to the second tool piece, wherein the alignment ring is disposed between the first tool piece and the second tool piece;
   transcribing a first mark onto the first tool piece, wherein the first mark is a line traversing a length parallel to a central axis of the first tool piece disposed at a first end of the first tool piece;
   transcribing a second mark onto the second tool piece, wherein the second mark is a second line traversing a length parallel to a central axis of the second tool piece disposed at a second end of the second tool piece;
   transcribing an alignment mark onto the alignment ring;
   transcribing an offset mark onto the first tool piece;
   decoupling the first tool piece from the second tool piece;
   rotating the alignment ring, wherein rotating the alignment ring comprises of aligning the alignment mark with the offset mark;
   coupling the first tool piece to the second tool piece;
   applying a torque to the first tool piece and the second tool piece to seat the first tool piece and the second tool piece to the alignment ring to produce the tubular assembly; and
   inserting the tubular assembly downhole into a wellbore.

19. The method of claim 18, wherein decoupling the first tool piece from the second tool piece produces a tolerance gap, wherein the tolerance gap allows the alignment ring to rotate.

20. The method of claim 18, wherein the alignment ring has an inner diameter of from about 2 inches to about 12 inches and an outer diameter of from about 2.5 inches to about 14 inches.

* * * * *